Figure 9:
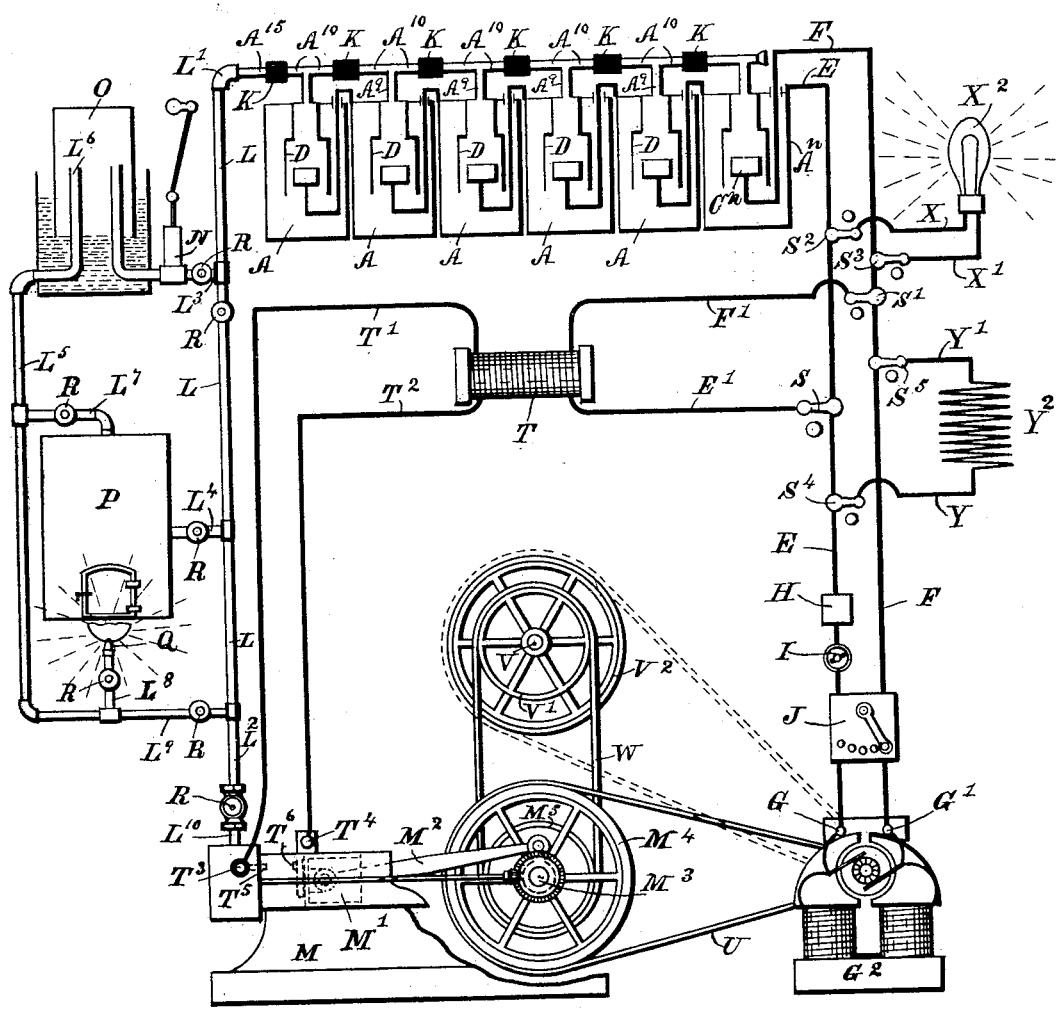

(No Model.) 2 Sheets—Sheet 1.
L. H. WATTLES.
SYSTEM OF GENERATING AND USING HYDROGEN GAS AND ELECTRICITY.
No. 583,104. Patented May 25, 1897.
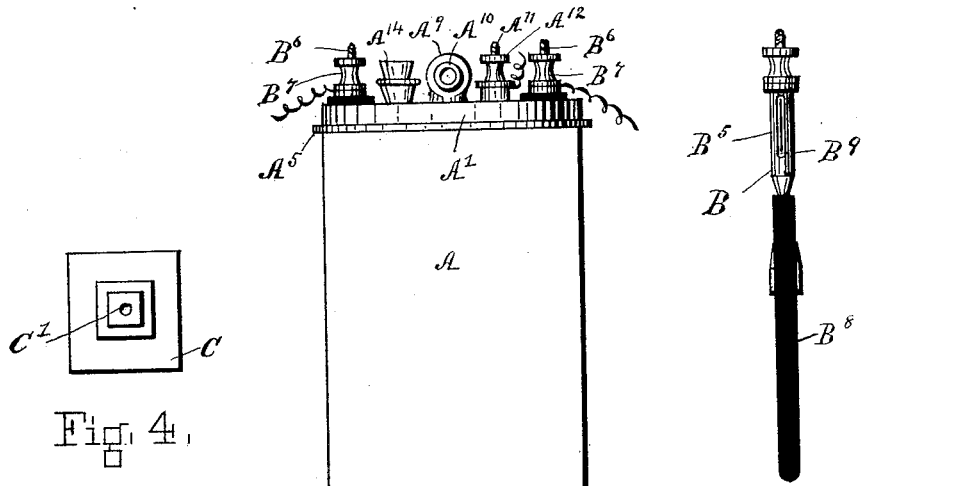
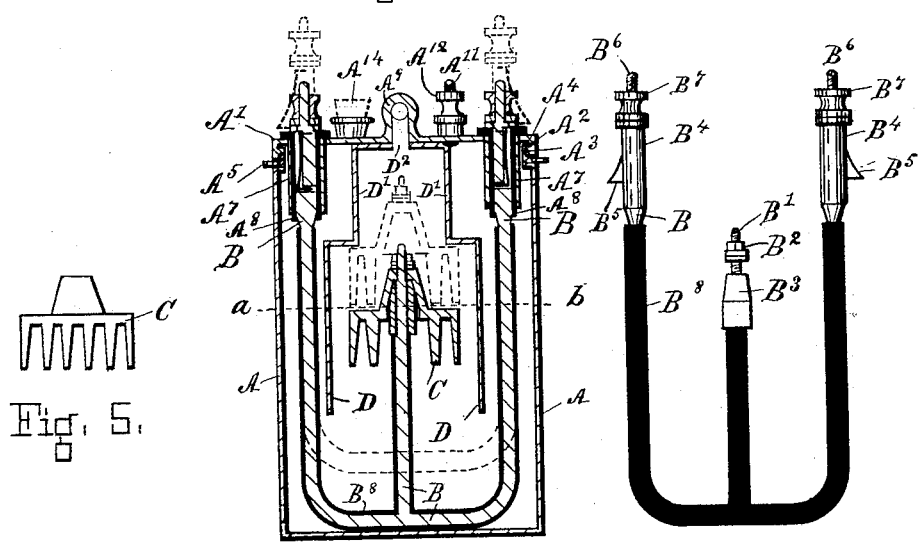
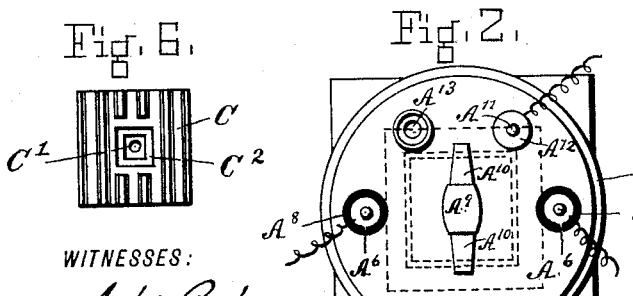
WITNESSES:
James A. McBain
B. C. Davis
INVENTOR
Luther H. Wattles.
BY
Thos. F. Gaynor,
ATTORNEY.

UNITED STATES PATENT OFFICE.

LUTHER H. WATTLES, OF PROVIDENCE, RHODE ISLAND, ASSIGNOR, BY DIRECT AND MESNE ASSIGNMENTS, OF THREE-FOURTHS TO WILLIAM B. SHERMAN, OF SAME PLACE, AND BYRON C. DAVIS, OF BROOKLYN, NEW YORK.

SYSTEM OF GENERATING AND USING HYDROGEN GAS AND ELECTRICITY.

SPECIFICATION forming part of Letters Patent No. 583,104, dated May 25, 1897.

Application filed December 7, 1895. Serial No. 571,336. (No model.)

*To all whom it may concern:*

Be it known that I, LUTHER H. WATTLES, a citizen of the United States, and a resident of Providence, in the county of Providence and State of Rhode Island, have invented certain new and useful Improvements in Systems of Generating and Using Hydrogen Gas and Electricity, of which the following is a specification.

This invention relates to improvements in systems of generating and using hydrogen gas and electricity; and it consists in providing a generator or a number of generators in which hydrogen gas and electricity are both generated simultaneously, combining therein gas-collecting apparatus having ducts for conducting the gas to the apparatus or mechanism intended for its storage or use, with conductors for the electricity generated therein to deliver it to the apparatus intended for its use, and in combining the gas-using apparatus and the electrical apparatus with a common means of receiving the energy developed by the conversion of the gas and electricity into mechanical power, so that the two forms of energy developed in the generator thus become collected, converted, and delivered at the same time to the same mechanism for its utilization or work.

The object of my invention is to provide a generator of hydrogen gas and electricity and to combine with the same such a combination of apparatus and mechanism capable of converting them into the form of useful work as will secure by said means the maximum availability and use of the forces developed in the generator.

The character and purposes of my invention will be more fully explained and understood by reference to what follows herein and as will be pointed out in the claims, and also by reference to the accompanying drawings, in which—

Figure 1 represents a front view of the generator. Fig. 2 represents a vertical section of the same. Fig. 3 is a top or plan view of the generator. Fig. 4 is a top view of the zinc or other element employed for the generation of the gas and electric current. Fig. 5 is a side elevation of Fig. 4. Fig. 6 is a bottom view of Fig. 4. Fig. 7 is a front elevation of the holder and terminal for the zinc or other electrode. Fig. 8 is a side elevation of Fig. 7. Fig. 9 represents a diagram of a battery of generators having gas and electrical conductors combined therewith, a gas-engine connected with the gas-conductors, and an electric motor connected with the electric conductors and the engine and the motor both applying their power to the same work-shaft. This figure also shows how the gas may be conveyed or forced into a suitable holder adapted for its storage, if desired, and it also shows how the gas can be connected with a carbureter if it is desired to enrich it by the addition therewith of carbon or hydrocarbon gas for illuminating purposes or in transit to the engine. It also shows how the electric current can be utilized for electric lighting or heating purposes. The figure further shows how the electric spark which is required for igniting the gas in the engine is obtained by the induction-coil necessary for the purpose and the electrical connections of the same with the generator and the engine.

In the drawings, A represents a cup or cell, made of copper, to which a cover A' is fitted, by means of an internal screw-thread $A^2$, to the corresponding external screw-thread $A^3$ upon the neck $A^4$ of the cup A. A packing $A^5$ is fitted around the neck of the cup, so as to make a tight joint between the cup and the cover when the latter is screwed on in position thereon.

The cover A' has two apertures $A^6$ $A^6$, through which the holder B projects and upon which the electrode C is mounted when in position within the cup A. The electrode or zinc C has a central opening C', through which the threaded extremity B' of the holder B passes, and by means of the nut $B^2$ the zinc C and the holder B are thereby securely connected together. The lower portion of the aperture C' is enlarged and squared, as seen at $C^2$, to fit a correspondingly-shaped portion $B^3$ of the holder B to prevent the zinc C from turning upon the holder B through accident or otherwise. The cover A' is provided with sleeves $A^7 A^7$, having insulation-bushings $A^8 A^8$, by means of which the holder B and the cover A' may be insulated from each other. Each of the necks $B^4 B^4$ of the holder B is provided with a spring retaining-catch $B^5$, which is fitted in a groove $B^9$ therein and by means of which the holder will be held in an elevated position, as indicated by the dotted lines in Fig. 2, by resting upon the bushings $A^8 A^8$ whenever it is desired to lift the zinc out of the solution in the cup and hold it in that position. The sleeves $A^7 A^7$ in the cover A' retain the holder B with the zinc C in a central position in the cup in case the latter should be tilted or the like. The holder B is provided with an insulating-covering $B^8$ to prevent short-circuiting in the cup or with it.

Within the cup A an inverted gas-collector D, of copper or other metal, is arranged and secured to the cover A'. The collector D is of larger dimensions than the zinc C in that portion of it within which the zinc is suspended, so that no contact is made between the two parts of the device, but is narrowed in its dimensions in its upper portion D' and is provided with an aperture $D^2$, which also extends through the cover A' and through a gas-conductor $A^9$, having nipples $A^{10} A^{10}$, to which conducting tubes or pipes for conveying the gas generated within the collector may be connected. The cover A', which, together with the entire shell of the cup A, forms one of the electrodes of the generator or battery, is provided with a binding-post $A^{11}$, having a nut $A^{12}$, to which the wire conductor for the current generated may be connected. The holder B has upon its upper extremities a corresponding pair of binding-posts $B^6 B^6$ and nuts $B^7 B^7$ for the other conductor to be connected with. The cover A' is also provided with an opening $A^{13}$, to which a stopper $A^{14}$ is fitted for the purpose of filling the cup with the solution required, renewing or decanting it, or the like.

The solution required to generate the gas consists of water and sulfuric acid or any other acid that will liberate hydrogen gas and generate electric currents by its chemical action upon zinc, iron, or other substance capable of such effects. The strength of the solution is determined by the rapidity with which the gas and electricity are to be produced and may be varied from, say, one part (in bulk) to twenty parts of water up to one part acid to four parts water or even stronger than this when quick action is necessary. The production of hydrogen gas and electricity by the chemical action of dilute sulfuric acid upon zinc being well known and understood its further description is deemed unnecessary. My generator being thus described I will now explain the manner of its use in combination with the other mechanism required to carry out the purposes of my invention.

Referring to Fig. 9, A A A represent a series or battery of generators made as already described. The cups and zincs are connected alternately in series like any battery of galvanic cells connected up to produce a maximum voltage; but the generators may be also connected in multiple arc if quantity rather than voltage is required; or modifications of both of these methods of connecting up the poles of a number of cells may be employed, if preferred. The terminal elements $A^n C^n$ of the battery are connected with the conducting-wires E F, respectively, which connect in turn with the terminals G G' of an electric motor $G^2$ and to which the current generated as described is conducted and in which it is converted into mechanical power by the motor in the well-known manner of electric motors. The circuit-conductors E F, leading to the motor $G^2$, have the usual fuse H, switch I, and resistance-box J, by means of which the current to the motor can be controlled. Each one of the gas-conductors $A^9 A^9$, leading from the gas-collectors D D of the generators A A, is connected by means of its respective nipples $A^{10} A^{10}$ and couplings K K, which are made of any suitable insulating substance not subject to destructive effects of the gas, so as to make one continuous conduit for the gas evolved by the whole series of cups that may be in active operation producing the gas at the time. The gas is conducted by the main duct L to the gas-engine M, one end L' of the duct being connected with the conductor $A^{15}$ at the end of the series of cells A A A and the other end $L^2$ with the gas-engine M for this purpose. A branch duct $L^3$ leads to a pump N and gas-holder O. Another branch pipe $L^4$ leads to a retort or carbureter P. The pipe $L^5$ has a connection $L^6$ with the gas-holder O and another, $L^7$, with the carbureter P, another, $L^8$, with the gas-burner Q, and, finally, one, $L^9$, which connects it again with the main duct L. Valves or cocks R R R are fitted in the gas-ducts around in the different positions necessary for the proper control of the flow and manipulation of the gas as required.

The gas-engine M receives its supply of gas through the pipe $L^{10}$, the flow of which is regulated by the valve R'. $M^6$ represents a beveled gear mechanism which actuates the valve mechanism (not shown) of the engine M.

The conductors E F are provided with switches S S', having terminal connections with the conductors E' F', in which the induction-coil T is in circuit. The conductors T' $T^2$ have terminals $T^3 T^4$ at the engine M and connections with the coil T, by which a circuit between it and the engine M is established whenever the electrodes $T^5 T^6$ within the cylinder are in contact. The piston M', to which the electrode $T^6$ is attached, carries the latter away from the electrode $T^5$ with every outward stroke of its operation, thereby breaking contact with the electrode $T^5$ and producing an electric spark within the gas contained in the cylinder and igniting it at a right time, so as to cause the proper explosive effect necessary in operating gas-engines.

The power of the engine M is applied, through its connecting-rod $M^2$, to the crank-shaft $M^3$ in the usual manner. The power of the motor $G^2$ may be applied to the crank-shaft $M^3$ of the engine M through the belt U and wheel $M^4$ of the engine M, in which case the engine crank-shaft becomes the common receiver of power produced by the motor and the engine.

A work-shaft V may be provided having a pulley $V'$, over which the belt W runs and is driven by a pulley $M^5$ on the engine-shaft $M^3$. The shaft V has also a pulley $V^2$, to which the belt U from the motor $G^2$ may be directly connected, as shown by the dotted lines, if preferred. By this arrangement the shaft V becomes the receiver of power produced by the engine and the motor and from which it could be transmitted otherwise for application or use.

Switches $S^2$ $S^3$ in the conductors E F have terminal connections with the circuit-wires X $X'$, in which the electric lamp $X^2$ is placed and by means of which the electric current from the generators may be caused to produce light. Switches $S^4$ $S^5$ are also placed in connection with the conductors E F and having terminal connections with the loop Y $Y'$, in which the resistance or heating coil $Y^2$ is placed in circuit, so that the electric current may be utilized for heating purposes, if desired.

The operation of my invention will now be described: The generators are prepared for use by charging each one of them with a solution of acid of the requisite strength and filling each one to the level indicated by the dotted line $a\ b$ in Fig. 2, in which case all of the zinc C except its shank or neck becomes immersed therein and subject to the dissolving and chemical effects of the solution. The circuit between the zinc C and the cup A is closed, as indicated by the circuit established through the conductors E F and mechanism connected therewith in Fig. 9. The cap or cover $A'$ being adjusted upon the cup and the stopper $A^{14}$ being in place each generator becomes ready for effective use.

The gas connections between each of the generators and the external gas receiving and converting apparatus being in proper connection and condition, the gas becomes evolved in each generator and passes through the collectors through the ducts and through the engine, where it is used, as produced, in producing mechanical effect, as already described, or it may be delivered into the holder O and stored there until required for use; or it may be passed through the carbureter P and enriched, as already described, by the addition of carbon or hydrocarbon gases and afterward used in the engine or for illuminating or other purposes, as desired.

The electric current, which becomes generated simultaneously with the evolution of the gas and the disintegration of the zinc, is converted by the motor into mechanical power, which may be applied to the crank-shaft of the engine or the independent work-shaft, as already explained. It can thus be seen that the two forms of energy simultaneously generated in the generators are at the same time transmitted to the corresponding mechanisms for converting them into mechanical energy, and in this way the maximum efficiency for useful work is delivered to the work-shaft intended for its reception and use. It can also be observed that the electric current from the generator also coöperates through the agency of the induction-coil with the gas in igniting the latter in the engine, and thus effects the successful operation of the engine.

The importance of this invention may be understood from the fact that for some purposes primary batteries used for generating electric currents alone are near the point, as to economy, of successful competition with other methods of generating and using electricity. Now by the additional useful efficiency obtained by this method of using the gas as generated simultaneously and in conjunction with the electricity produced it can be seen that it makes it possible for applications of this system of producing and using power in many ways and under conditions never successful commercially heretofore. Its use therefore is in the case of small units of application peculiarly well adapted as a means of propulsion for bicycles, tricycles, motocycles, or horseless vehicles and other forms of carriages, cars, and devices for transportation. Its adaptability for work of this character can be more fully understood by reference to another application, dated December 7, 1895, for Letters Patent, Serial No. 571,338, which I have made and which is now pending before the office for an improvement in motocycles. The details of the application of hydrogen gas in this way to the operation of gas-engines can also be better understood by reference to another application for Letters Patent, dated December 7, 1895, which I have also made, Serial No. 571,337, and which is likewise pending before the office, for an improvement in gas-engines.

The invention is likewise applicable to the propulsion of boats, stationary power installations, small or large, as may be required. Large installations of generators for the production and use of hydrogen gas and electricity can likewise be made and the gas used for general lighting and heating purposes as well and stored in large holders and carbureted as commercial illuminating-gas is now treated. The electricity can from the same plant be used for heating, lighting, and power purposes, as now done, in addition to or independent of the combination of the engine and motor mechanism herein shown and described as in combination.

I am aware that it has been proposed to generate oxygen and hydrogen gases in a battery from the decomposition of water and to use the electricity generated to also assist in the generation of the two gases within the battery in the well-known way of decomposing water by the electric current and then conducting the two gases to separate reservoirs, where they were to be accumulated and confined until a pressure of several atmospheres was obtained, and the gases then conducted to separate engines, where they were to be used expansively, like steam or compressed air, and then to be returned again to the battery by suitable mechanism devised for the purpose and then to be used over and over again, as before. Now I do not claim such a system of gas generation or utilization, and my system is unlike it, as I conduct the electricity outside of the generator and utilize it directly in running a modern dynamic electric motor if for power purposes or apply it directly to an electric lamp or heater if for lighting or heating purposes. I use the electricity external to the battery and not within it. Then the gas is used explosively in the gas-engine and by its ignition and not merely by its expansion from an artificial compression, as compressed air is used in an air-engine. I also use the gas and electricity in the same engine and cylinder mechanism, and I couple a modern electric motor and a common gas-engine directly or indirectly to the same work-shaft, and thus generate the two forms of energy in the same generator and utilize them in the same mechanism for conversion.

Having thus described my invention, what I claim, and desire to secure by Letters Patent, is—

1. In combination with a generator, or series of generators of hydrogen gas and electricity, the electric conductors connected with the electrodes of the generator or generators, the electric-dynamo motor mechanism connected with the electric conductors, a gas-duct connected with the gas collector or collectors of the generator or generators, a gas-engine having connection with the gas-duct and adapted to be operated by the gas from said generator or generators, and the mechanisms of the engine and motor for the delivery of the mechanical power produced by the engine and motor, being connected to the same shaft or means of utilization, substantially as specified.

2. In combination with a generator, or series of generators of hydrogen gas and electricity, an electric-dynamo motor mechanism connected with the electric generating devices of the generator, a gas-engine mechanism connected with the gas-generating apparatus of the generator and the power-delivery mechanisms of the electric motor and the gas-engine being connected to the same power-receiving apparatus, substantially as specified.

Signed at Brooklyn, in the county of Kings and State of New York, this 5th day of December, A. D. 1895.

LUTHER H. WATTLES.

Witnesses:
G. W. IRWIN,
JAMES A. McBAIN.